United States Patent [19]

Pribat et al.

[11] Patent Number: 5,127,990
[45] Date of Patent: Jul. 7, 1992

[54] METHOD OF FABRICATION AN ELECTRONIC MICRO-COMPONENT SELF-SEALED UNDER VACUUM, NOTABLY DIODE OR TRIODE

[75] Inventors: Didier Pribat, Paris; Jean-Pierre Le Pesant, Gif sur Yvette, both of France

[73] Assignee: Thomson-CSF, Puteaux, France

[21] Appl. No.: 377,090

[22] Filed: Jul. 7, 1989

[30] Foreign Application Priority Data

Jul. 8, 1988 [FR] France ................ 88 09303

[51] Int. Cl.⁵ .............. B44C 1/22; C23F 1/02; C03C 15/00; C03C 25/06
[52] U.S. Cl. .................. 156/644; 156/653; 156/656; 156/657; 156/659.1; 427/78
[58] Field of Search ........... 156/644, 650, 653, 654, 156/656, 657, 659.1; 313/308, 309, 351, 498, 574, 575, 576, 584; 427/77, 78

[56] References Cited

U.S. PATENT DOCUMENTS

| | | | |
|---|---|---|---|
| 3,921,022 | 11/1975 | Levine | 313/309 |
| 4,163,949 | 8/1979 | Shelton | 313/309 X |
| 4,721,885 | 1/1988 | Brodie | 313/309 X |

FOREIGN PATENT DOCUMENTS 0234989 9/1987 European Pat. Off. .

Primary Examiner—William A. Powell
Attorney, Agent, or Firm—Oblon, Spivak, McClelland, Maier & Neustadt

[57] ABSTRACT

The disclosure concerns the making of microcomponents belonging to the family of vacuum tubes of the diode, triode and electroluminescent component type. The goal thereof is notably to resolve problems of fabrication under vacuum, and of precise anode-cathode spacing. This goal is achieved by constructing a microcomponent of the stacked structure type wherein the anode is made in the form of a metallic layer for sealing the cavity under vacuum containing the microcathode, and wherein at least one solid dielectric layer provides for the spacing between the anode and the microcathode.

14 Claims, 5 Drawing Sheets

METHOD OF FABRICATION AN ELECTRONIC MICRO-COMPONENT SELF-SEALED UNDER VACUUM, NOTABLY DIODE OR TRIODE

BACKGROUND OF THE INVENTION

Field of the Invention

The field of the invention is the making of microcomponents belonging to the family of vacuum tubes, of the diode, triode and electroluminescent component type.

In recent years, there has been a renewal of interest in vacuum tubes (especially micro-tubes) for special applications such as very wideband components and components which are hardened to radiation.

This renewal of interest has been stimulated by the application, to the fabrication of tubes, of technological methods used by the electronics industry for micromachining and the fabrication of semiconductor-based components. For, while it has long been known that manipulating electrons in a vacuum makes it possible to communicate speeds of motion to them which are greater than those obtained in solids, vacuum tube fabrication technologies do not enable any miniaturization compatible with a reduction in the access time to values comparable to those obtained with semiconductor-based components and circuits (notably because of the resistors and capacitors of the control lines). Furthermore, the cathodes of vacuum tubes work by thermionic emission. This requires heating of the source and, therefore, a special environment for the source. The space charge effects in front of thermionic cathodes further require the use of high voltages so as to achieve electrical field values compatible with the removal of a sufficient number of electrons.

The manufacture of systems of tiplet by means of micro-electronic technologies (see for example, C.A. SPINDT et al., Journal of Applied Physics, Vol. 47, December 1976, page 5248) has enabled the making of field emission micro-cathodes with dimensions similar to those of solid state electronic components. These micro-cathodes have been used for the fabrication of electron microguns (U.S. Pat. Nos. 3,743,022, 4,663,599) as well as for the fabrication of matrix networks of electron microguns (U.S. Pat. No. 4,498,592). The recognized advantages associated with the reduction in dimensions are related to the possibility of obtaining very intense electrical fields ($>10^7$ V/cm) with moderate extraction voltages (some hundreds of volts). In the case of triode type components, if the anode-microcathode distance is small, the space charge effects before the microcathodes can be eliminated for relative low anode/cathode voltage values. Thus, the carriers are accelerated to their final speed more quickly than in solids. This enables reduction in the transit time. The access times (RC of the control lines) are furthermore identical to those obtained in solid state devices, and the speeds of motion of the electrons in a vacuum may, in practice, reach some $10^8$ cm/s as compared with some $10^7$ cm/s in the most efficient semiconductors (InSb).

Vacuum microtubes manufactured on the basis of field effect microcathodes thus enable the manufacture of components that are potentially faster than semiconductor-based solid state components.

Components such as this have already been made and, in particular, have been made with technologies used for the fabrication of silicon-based integrated circuits (H.F. GRAY et al., IEDM 1986, 33-1, p. 776).

This is a "planar" type of approach where the source, grid and anode are arranged in one and the same plane which is the upper plane of the substrate.

Another approach has also been used, wherein the anode (10) is a metallic plate facing the cathode (6) and the grid (3) ("stacked" type structure). This structure is shown schematically in FIG. 1. The cathode (6) is formed on a substrate (1), within a cavity (5) hollowed out in a dielectric layer (2).

The drawback of these two structures is that they cannot work except under high vacuum ($10^{-10}$ Torr) and that, in particular, various adsorptions are liable to make notable modifications in the emission properties of the tiplets. To avoid this type of phenomenon, means should be provided for in-situ sealing in a glass bulb, or other container, so that the tiplets are not re-exposed to the atmosphere after their manufacture. When a network of tiplets is used, it is also necessary to see to it that the anode/grid distance is strictly maintained so as not to induce any excessive variation in the characteristics of the components. It might also be added that the definition and positioning of an individual anode (of the same dimensional magnitude as the cathode) facing the cathode may rise raise serious technological problems. It is therefore difficult to make each tiplet on an individual basis to make it a transistor type of an elementary component.

The invention enables these different drawbacks to be overcome.

SUMMARY OF THE INVENTION

To this effect, an object of the invention is an electronic microcomponent, notably a diode, triode or electroluminescent component, of the stacked structure type with a field emission microcathode formed in a cavity under vacuum, surmounted, as the case may be, by a metallic control grid, with an anode placed at a distance from said the microcathode, comprising at least one microvolume, each sheltering a microcathode, each microvolume being self-sealed by the anode, the spacing between the tiplet of the microcathode and the anode being defined by a solid dielectric formed by deposition.

According to the invention, an electric microcomponent such as this is advantageously obtained by means of a fabrication procedure, notably comprising the following successive steps:

the formation of a microcavity by deposition, on a conducting substrate, of a first dielectric layer, a conductive grid layer and a second dielectric layer, and then by hollowing until the conductive reception substrate of the microcathode;

the vapor deposition, under high vacuum, of the anode layer so as to simultaneously form the microcathode at the bottom of the microcavity and perfectly seal said cavity.

Advantageously, the layer is deposited under a high vacuum by vapor deposition at normal incidence, the deposition also providing simultaneously for the formation of the microcathode at the bottom of the cavity.

According to another advantageous embodiment of the invention, the deposition of the anode layer is preceded by a step for the formation of the microcathode at the bottom of the cavity by vapor deposition under high vacuum and under normal incidence, the anode layer being then deposited by vapor deposition under grazing incidence at least at the aperture of the cavity so as not to pollute the previously-formed cathode.

In the latter case, which generally corresponds to an embodiment wherein the material forming the microcathode is different from the material forming the anode layer, it is advantageous for the step of formation of the microcathode to be, firstly, preceded by a step for the deposition of a temporary layer made of a specific material, the specific material being selectively soluble with respect to the material forming the microcathode and, secondly, followed by a step for dissolving the temporary layer.

BRIEF DESCRIPTION OF THE DRAWINGS

The characteristics and advantages of the invention will appear from the following description of some embodiments of the invention, given as a non-restrictive illustration, and the appended drawings, wherein.

DESCRIPTION OF PREFERRED EMBODIMENTS

The structure of different versions of a triode type microcomponent according to the invention is shown in FIGS. 2, 5, 7 and 8.

Figure 1:
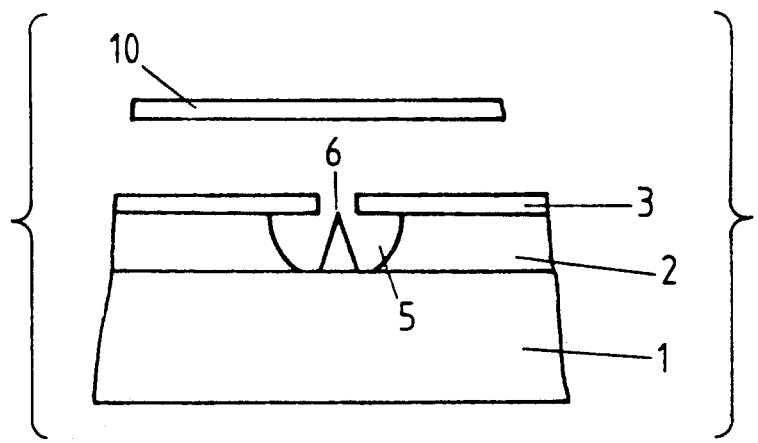
FIG. 1 shows a stacked structure triode type of microcomponent of the prior art.
Figure 2:
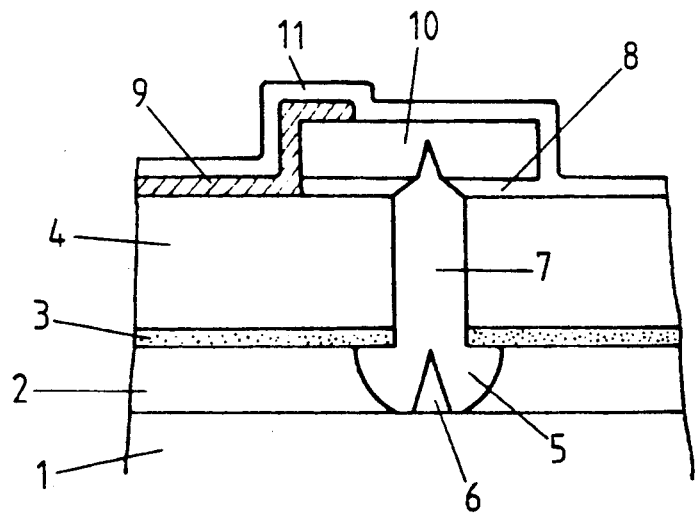
FIG. 2 is a preferred embodiment of the self-sealed microcomponent according to the invention.

As can be seen in FIG. 2, the microcomponent is formed successively by a conducting substrate 1, surmounted by a first dielectric layer 2, a metallic layer 3 acting as an electron extraction grid and a second dielectric layer 4. A cavity 7, as well as sub-cavity 5 are etched in the layers 4, 3, 2, so that it is possible to house a cathode in tiplet 6 form.

The second dielectric layer 4 is, for its part, surmounted by a getter-forming metallic layer used to promote and maintain the vacuum of the cavity 5, 7 after sealing.

The anode 10 houses and seals the cavity 5, 7 under vacuum.

The component also has a lug 9 for the connection of the anode 10, as well as a passivating coat 11.

Figure 5:
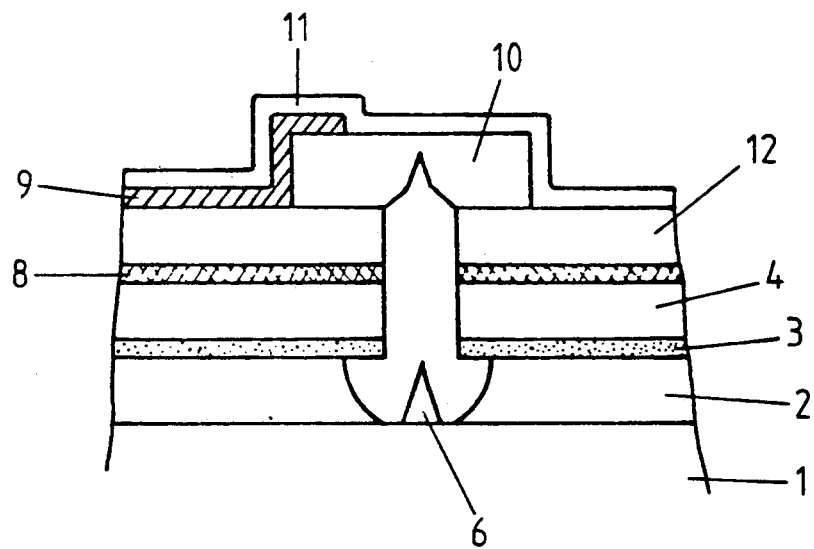
FIG. 5 is a drawing illustrating the structure of a third embodiment of the microcomponent according to the invention, with a getter-forming titanium layer sandwiched between two dielectric layers.
Figure 3A:
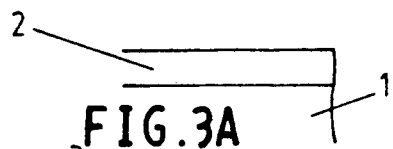
FIG. 3A-I is formed by a sequence of eight drawings illustrating the successive steps of a first preferred embodiment of the method of fabrication of the microcomponent according to the invention.
Figure 3B:
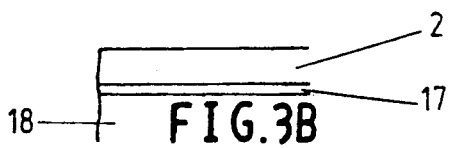
Figure 3C:
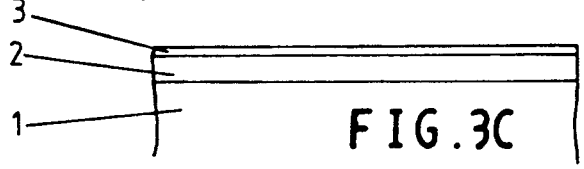
Figure 3D:
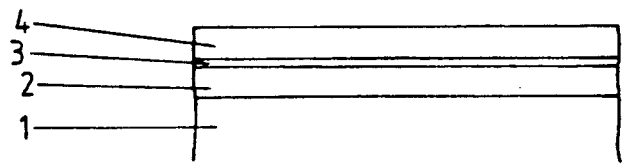
Figure 3E:
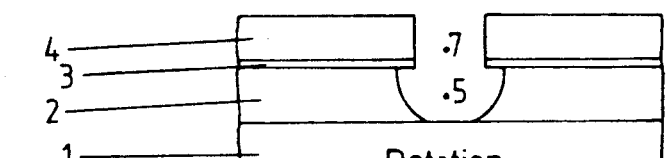
Figure 3F:
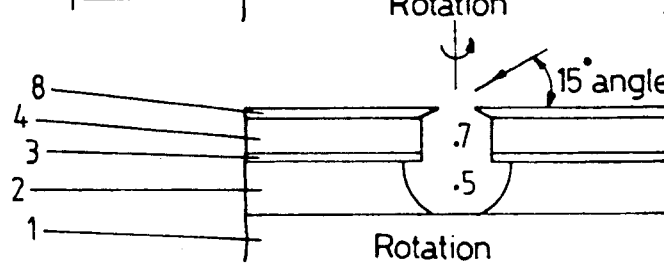
Figure 3G:
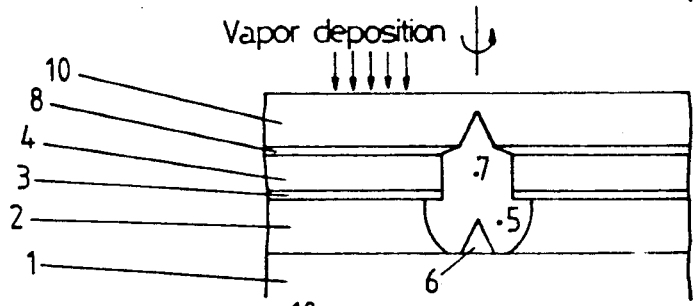
Figure 3H:
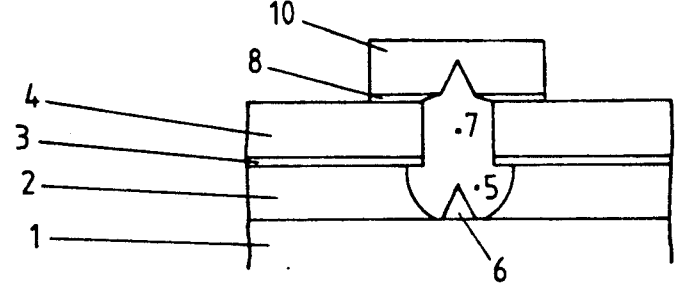
Figure 3I:
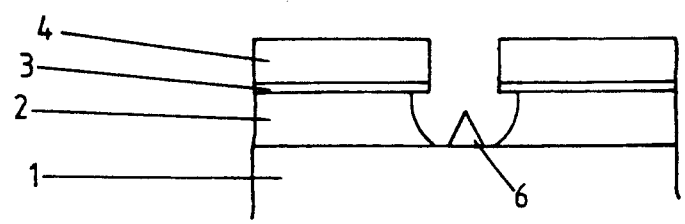

In the embodiment of FIG. 5, the getter-forming layer 8 is sandwiched between the second dielectric layer 4 and a third dielectric layer 12.

Figure 7:
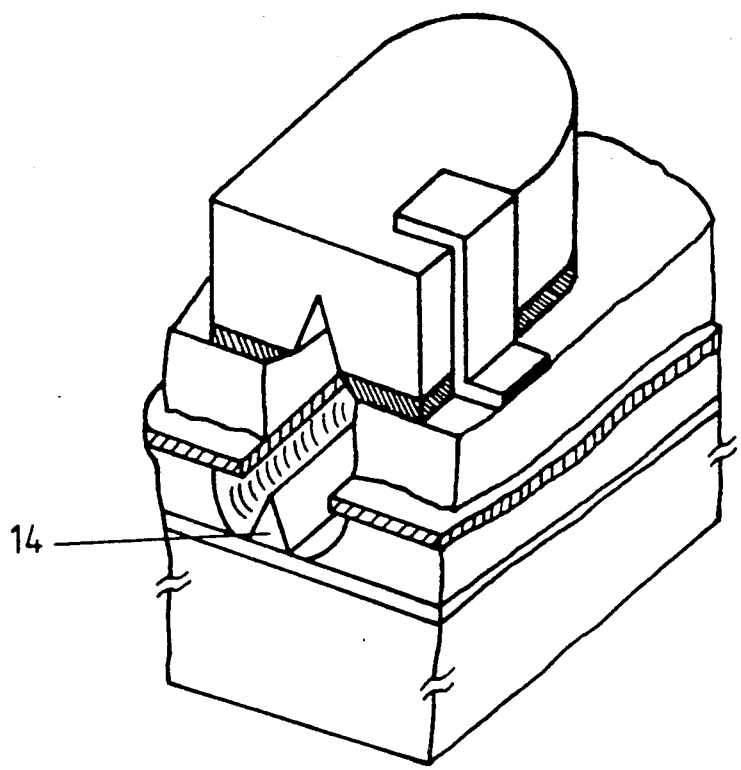

Finally, in the version of FIG. 7, corresponding to the making of a microcomponent with high emission currents, it will be noted that the cathode 14 is made in prism form. In this case, the cavity 13 is made advantageously as an oblong section, instead of the substantially circular section of the embodiments of FIGS. 2 and 5 with the cathode 6 in tiplet form.

A first advantageous method for making the component according to the invention is shown, in successive steps, by the drawings of FIG. 3. The numbers of each drawing of FIG. 3 correspond to the following steps given by way of indication:

Step (1)

A first dielectric layer 2 is formed such that, for example, $SiO_2$ is formed (thickness of 1 to 1.5 μm) by oxidation (case of a silicon substate) or by deposition, on a conductive substrate 1.

Step (1a)

This step is alternative to step (1); a metallic conductive layer 17 (thickness 0.2 to 1 μm approximately) and a dielectric layer 2 ($SiO_2$...) with a thickness of 1 to 1.5 μm are deposited successively on an insulating substrate 18 (glass wafer, alumina, etc.).

Step (2)

A metallic grid layer 3 (0.2 to 0.3 μm approximately) is deposited on the previous unit.

Step (3)

A dielectric layer 4 such as, for example, $Si_3N_4$ is deposited on the previous unit (thickness of 2 to 20 μm approximately).

Step (4)

The dielectric layer 4 and the grid 3 are etched in a first hollowing operation. For a cathode with tiplet 6, the cavity 7 has a substantially circular section. The diameter of the aperture 7 is then preferably of the order of 1.5 to 3 μm.

The dielectric 2 is etched in a second operation, so as to make a sub-etching 5 under the grid 3. Should a high density of tiplets per surface unit be desired, the sub-etching 5 will be limited or even non-existent.

Step (5)

With the substrate driven by a rotation motion, a deposition is made, with a grazing incidence (typically <15 degrees), of a titanium layer (with a thickness of about 0.1 to 0.5 μm) which will serve to fix the diameter of the base of the tiplet 6. Furthermore, the titanium layer will also serve as a getter 8 in the microvolume 5, 7 which will shelter the tiplet 6, so as to improve, if necessary, the residual vacuum in this microvolume. It must be noted that the titanium layer is deposited so that it does not totally obstruct the aperture 7 previously hollowed out by etching.

Step (6)

With the substrate being once again driven by a rotational motion, a second metallic layer (for example molybdenum) with a thickness of about 1 to 6 μm is vapor deposited at an incidence normal to the plane of the substrate. This second metallic layer is used to form the tiplet 6 on the one hand, and the anode 10 on the other hand.

According to the invention, the residual vacuum before the operation for the vapor deposition of the above-described metallic layer is about $10^{-10}$ Torr. Furthermore, the possibility is retained of heating the substrate towards 700°-800° C. before deposition so as to desorb any gas impurities inside the microcavities and obtain a better vacuum inside these cavities.

The residual vacuum (of about $10^{-10}$ Torr) having been achieved and the substrate having been sufficiently heated, the metallic layer is vapor deposited so that the thickness of the anode 10 is enough to seal the microvolume 5, 7. To this effect, after deposition, there could be an in-situ annealing of the metal forming the anode 10 so as to increase the average size of the grains (and hence the mechanical resistance) on the one hand, and improve the adherence of the getter 8/anode 10 unit on the dielectric 4 on the other hand.

In brief, the metallic layer deposited during the step 6 therefore serves:

(i) to form the tiplet cathode 6;

(ii) to seal the microvolume 5, 7, sheltering the tiplet 6, the vacuum prevailing in this microvolume being of the magnitude of the residual vacuum ($10^{-10}$ Torr).

(iii) to form the anode 10, the geometry of which is subsequently defined by etching.

Step (7)

The metallic layer deposited is kept in position and etched according to the configuration that has been defined for the anode. Thus, the etching enables the anode 10 facing the tiplet 6 to be localized and hence, enables the triode microtube component to be made on an individual basis.

Finally, during a last step, enabling the final structure of FIG. 2 to be obtained, the connections 9 for the control of the anode 10 are deposited and etched and a passivating agent (phosphate silicate glass, for example), which shields the anode 10 against different forms of atmospheric aggression, is deposited.

However, the material of a metallic nature, deposited during the step (6) and serving, firstly, to make the microcathode 6 can also be chosen from among the elements of compounds having a low work function (TiC, La $B_6$ ... ).

In this case, it might be worthwhile to use a different material to form the anode 10. To do this, it is necessary to introduce a variant from the step (5) onwards. This variant may be illustrated by the steps (5') to (8') described below.

Step (5')

A layer of a material that could be attacked very selectively with respect to the material forming the tiplet is deposited in grazing incidence. This material is no longer necessarily titanium. Also, using this material and, just as in the drawing of FIG. 3, corresponding to the step 5, a layer is made. This layer will serve to fix the diameter of the base of the tiplet (deposition in grazing incidence).

Step (6')

The constituent material of the microcathode (LaB$_6$, TiC ... ) is vapor deposited in normal incidence (just as in the drawing corresponding to the step (6)).

Step (7')

The deposit made at (5') is dissolved so as to make the two layers deposited on the dielectric 4 ("lift-off" operation) at the steps (5') and (6') disappear. The structure obtained is shown in FIG. 3 (7').

Step (8')

A deposition is made, in grazing incidence, under high vacuum ($10^{-10}$ Torr), of the metallic metal forming the anode 10 so as not to pollute the tiplet which is already present.

Figure 4:
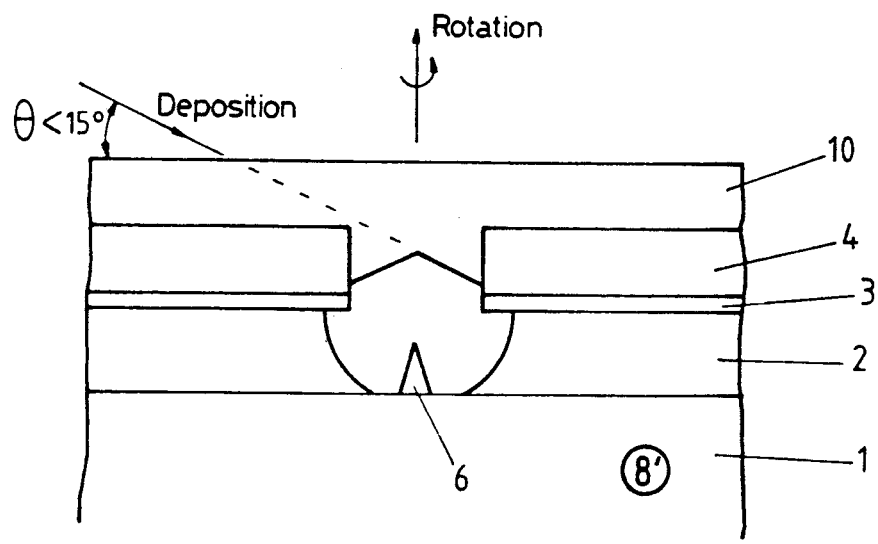
FIG. 4 is a drawing illustrating a particular step of a second embodiment of the fabrication method of the invention, after the dissolving of a temporary working layer ("lift-off operation")

In particular, the thickness of the dielectric 4 is computed as a function of the diameter of the aperture 7 and the angle of evaporation in such a way that the metal that is vapor deposited to seal the hole and act as an anode 10 cannot contaminate the tiplet 6. The drawing of the microcomponent thus made is shown in FIG. 4.

If necessary, a prior degassing of the structure (7') is done before deposition by heating it in the vacuum chamber as noted above. Similarly, after deposition, an annealing of the top metallization could be made for the reasons already explained.

The step (7) as described above is retained.

In order to obtain the getter effect, it is possible either to use a titanium grid 3 or to deposit, before the metallization of the anode 10, a titanium layer 8 (in grazing incidence) or to use an anode 10 made of titanium or again, to insert a sandwiched layer between two dielectric layers (4, 12) as already described in relation with FIG. 5.

The invention has been described until now on the basis of a triode type device but it goes without saying that if the grid 3 is eliminated and if the thickness of the dielectric 4 (the anode-cathode distance) is dimensioned accurately in a known way, a device working as a diode is obtained.

Figure 6:
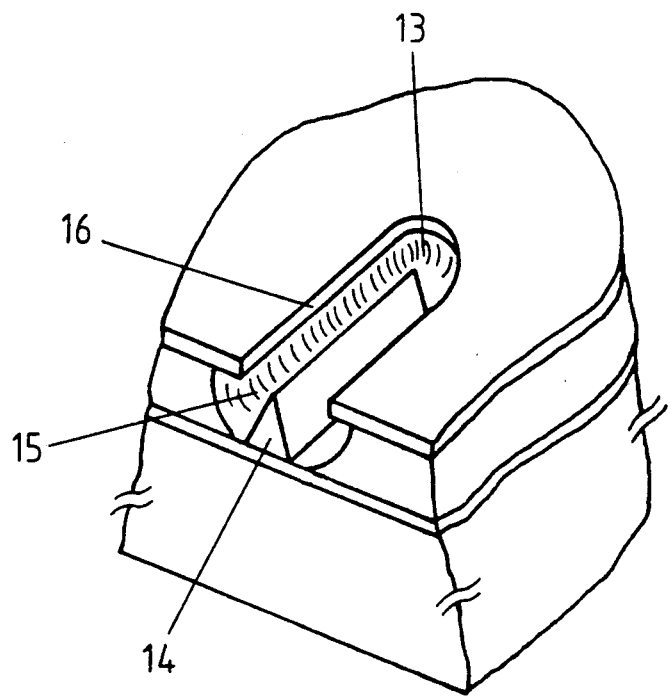
FIGS. 6 and 7 are sectional drawings illustrating the structural aspects of a preferred embodiment of the microcomponent according to the invention, in a version enabling the obtaining of high emission currents.

Finally, if it is sought to obtain high emission currents, it is possible to use either a row of tiplets or prism-shaped microvolumes 14 (see C.A. SPINDT et al. Application of Surface Science 16,268, 1983) obtained in the manner described in (6), but in replacing the circular apertures 7 by oblong apertures 13 (FIG. 6, 7).

In the same way as during the step (6) or during the step (8), the sealing will be done by deposition under high vacuum and the length of the prism 14 as well as the thickness of the sealing layer (anode 14) will be adapted for obvious mechanical reasons.

The invention can be applied notably to the fabrication of hardened components, high temperature components, wideband components, integrated circuits, etc.

Another application of the invention concerns light emitting devices.

In particular, in the field of light emission by cathodoluminescence, devices have been designed using networks of microcathodes (R. Meyer, A. Ghis, Ph. Rambaud, F. Muller—Japan Display Proceedings 1986 - page 512). These devices use cells wherein the tiplets and grids are manufactured separately on a first substrate and the luminophors are deposited on a counter-electrode (deposited on a glass strip for example) at a distance of about 100 $\mu$m. from the grid plane, this set being supported by a second substrate which is distinct from the former one. The set of two substrates is then assembled, put under vacuum and sealed. It goes without saying that the positioning of the anode plate at a constant distance of 100 $\mu$m from the grid plane of the cathode/grid plate raises technological problems. Furthermore, the vacuum sealing of the anode plate and the grids and cathodes supporting plate could also create aging problems. For, the smallest leak would affect the emission properties of all the microcathodes.

Figure 8:
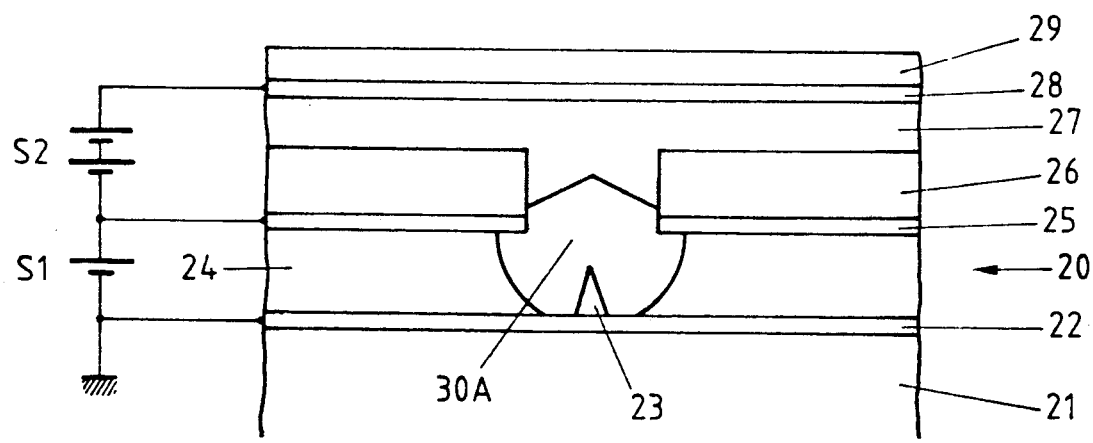
FIG. 8 is the drawing of an electroluminescent component obtained according to the method of the invention.

The present invention can be used to overcome these different drawbacks, since the luminophor (ZnO for example) is directly integrated at each light emission point in an arrangement such as that of FIG. 8.

In FIG. 8, the microcomponent element 20 respectively comprises: a substrate 21 (made of glass for example), a metallic strip 22 (Mo for example), a microcathode 23 (Mo, TiC, LaB$_6$ ... ), a first dielectric 24, a grid 25, an anode made of luminophor material (ZnO for example) 27, an ITO (indium-tin oxide) layer 28 and a translucid encapsulator 29. All these layers are deposited according to the above-described method. A high vacuum prevails in the microcavity 30A determined between the microcathode 23 and the luminophor 27. The layers 22, 25 and 28 are connected to appropriate voltage sources S1 and S2.

In the case of local leakage, only the microcathode in the concerned volume has its emission properties affected.

Figure 9:
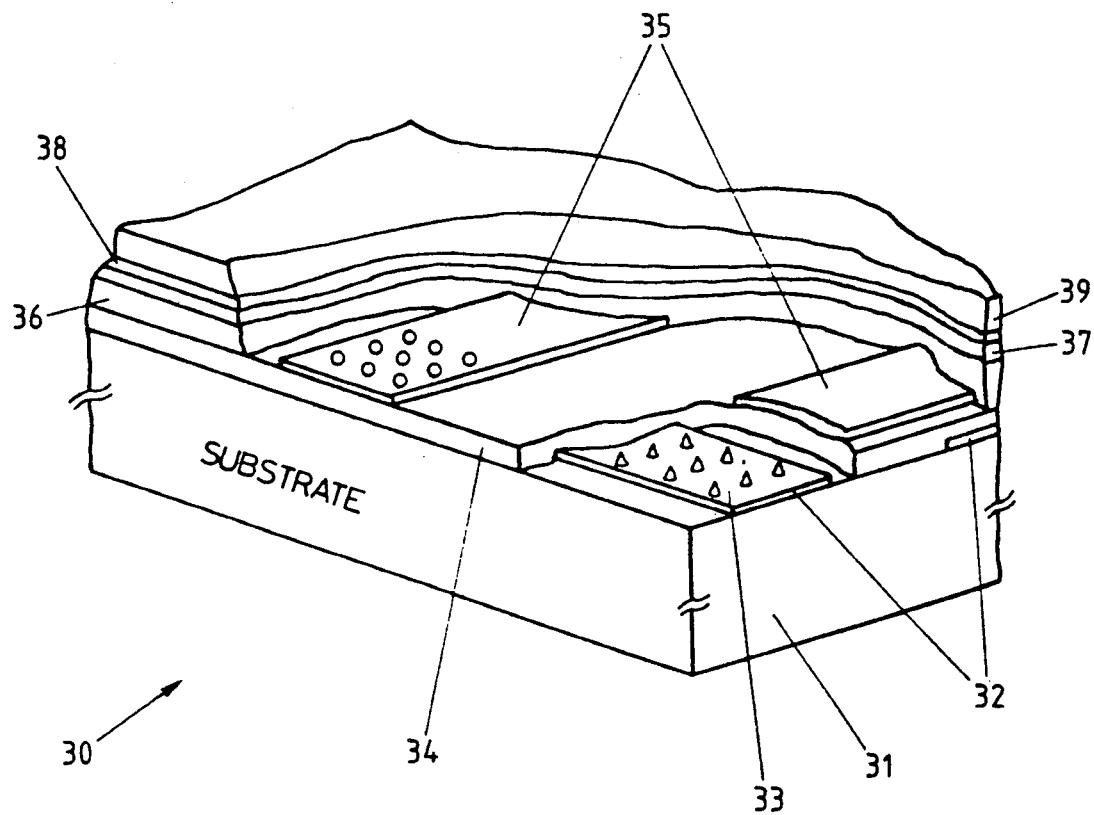
FIG. 9 is a partial view, in perspective, with a cutaway view of a matrix display device according to the invention.

According to an advantageous embodiment of the invention, it is possible to make a matrix display device with a wide area, such as the device of FIG. 9. This device 30 has, on a substrate 31, lines of cathodes 32 made of a conductive material on which microcathodes 33 are deposited according to the above-method. In the example of FIG. 9, nine microcathodes define a light point. Of course, the number of microcathodes for each light point depends on the dimension of the points and the definition required. For microcathodes with a diameter of about 2 to 5 μm, it is possible, for example, to have a density of about 625 microcathodes for a light dot with dimensions of 250 μm × 250 μm.

The structure 30 then has a first dielectric 34, columns of grids 35, the micro-apertures of which are, of course, facing microcathodes, a second dielectric 36 acting as an interposed layer, a luminophor layer 37, an ITO layer 38 and a translucid encapsulator 39.

What is claimed is:

1. A method for the fabrication of an electronic microcomponent on a substrate, comprising the steps of:
   forming a first dielectric layer on said substrate;
   forming a metallic control grid on said first dielectric layer;
   forming a second dielectric layer on said metallic control grid;
   hollowing out a central portion of said first dielectric layer, said metallic control grid and said second dielectric layer to form a cavity;
   vapor depositing, under vacuum conditions, an anode layer over said second dielectric layer and said cavity to simultaneously form said anode layer and a microcathode at a bottom of said cavity, said anode layer sealing said cavity.

2. A method according to claim 1, wherein said anode layer is deposited by high vacuum vapor deposition at normal incidence.

3. A method according to claim 1, wherein said step of vapor depositing the anode layer is preceded by a step for the formation of the microcathode at the bottom of said cavity by vapor deposition under high vacuum at normal incidence, said anode layer being then vapor deposited under grazing incidence at least at the aperture of said cavity, so as not to pollute said previously formed cathode.

4. A method according to claim 3, wherein said step for the formation of the microcathode is first preceded by a step for the deposition of a temporary layer made of a specific material, said specific material being selectively soluble with respect to the material forming the microcathode and is secondly followed by a step for the dissolving of said temporary layer.

5. A method according to claim 1, wherein said step for the hollowing out of the cavity is preceded by a step for the deposition of a layer formed by a material forming a getter on the second dielectric layer.

6. A method according to claim 1, wherein said step of vapor depositing of the anode and microcathode is made while moving the substrate rotationally.

7. A method according to claim 1, wherein said deposition of the anode layer is done under a vacuum of the order of $10^{-10}$ Torr.

8. A method according to claim 1 wherein, before the step of vapor depositing said anode layer, an operation for degassing is performed by heating said conductive substrate to a temperature of about 700° to 800° C.

9. A method according to claim 1, wherein said step of vapor depositing said anode layer is followed by an in-situ thermal processing step.

10. A method according to claim 1, wherein said deposited anode layer has a thickness of between 1 micron and about 6 microns.

11. A method according to claim 1, wherein said deposited grid layer has a thickness between about 0.1 micron and about 0.3 micron.

12. A method according to claim 1, further comprising the step of:
   a vapor depositing a getter layer on said second dielectric layer.

13. A method according to claim 12, wherein said deposited getter-forming layer has a thickness ranging from about 0.1 to about 0.5 microns.

14. A method according to claim 12, wherein said step of vapor depositing said getter layer is made while moving the substrate rotationally.

* * * * *